United States Patent [19]

Twomey

[11] 3,783,173

[45] Jan. 1, 1974

[54] GASKET-ELECTRICALLY CONDUCTIVE

[75] Inventor: Robert C. Twomey, Los Angeles, Calif.

[73] Assignee: The United States of America as represented by the Secretary of the Army, Washington, D.C.

[22] Filed: May 19, 1972

[21] Appl. No.: 255,123

[52] U.S. Cl. .......................... 174/35 GC, 277/235 R
[51] Int. Cl. .............................................. H05k 9/00
[58] Field of Search ................ 174/35 GC, 35 MS; 277/235, 236

[56] References Cited
UNITED STATES PATENTS 2,469,474   5/1949   Perry ............................. 174/35 GC
3,140,342   7/1964   Ehrreich et al. ................ 174/35 GC
3,230,294   1/1966   McAdams ....................... 174/35 GC

*Primary Examiner*—Darrell L. Clay
*Attorney*—William G. Gapcynski et al.

[57]  ABSTRACT

An electrically conductive elastomer gasket that is reinforced to lend strength to the gasket and enable the gasket to have the ability to hold a pre-set shape. This is accomplished by either sandwiching an electrically conductive reinforcement metal layer between two electrically conductive elastomer outer layers or by providing an electrical conductor about which an electrically conductive elastomer is formed or extruded.

2 Claims, 5 Drawing Figures

PATENTED JAN 1 1974　　3,783,173

GASKET-ELECTRICALLY CONDUCTIVE

BACKGROUND OF THE INVENTION

Electrically conductive gaskets are available from a plurality of companies and some of the gaskets contain a metal matrix imbedded in an elastic substance. Applicant has found the gaskets with the metal matrix imbedded therein to have many unusual and beneficial characteristics, but they suffer two very serious problems in that they will tear easily and will not hold their shape. The electrical conductivity of the gaskets are seriously degraded if the material is stretched. That is, the gasket material is seriously degraded from stretching even before it reaches the point of rupture. Therefore, an electrically conductive gasket is needed that has the capabilities of overcoming these difficulties and at the same time maintain the many beneficial characteristics.

Accordingly, it is an object of this invention to provide an electrically conductive gasket material that can be fabricated, handled, shaped, and installed without tearing or electrically degrading the material.

SUMMARY OF THE INVENTION

In accordance with this invention, a highly electrical conductive gasket is provided that has an elastomer with electrical conductive means therein and a metal layer centrally of the elastomer seal for reinforcing, lending support to the seal and making electrical contact with the electrical conductive means.

DESCRIPTION OF THE PREFERRED EMBODIMENT

Figure 1:
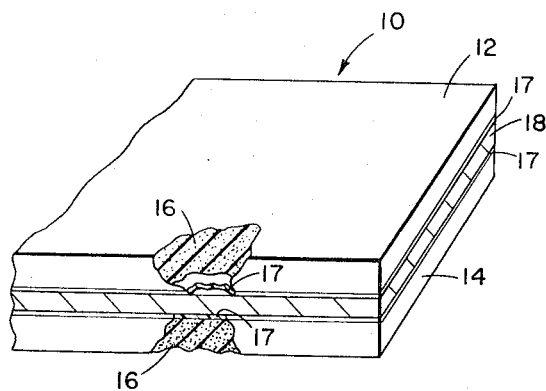
FIG. 1 is a perspective view, partially in section, illustrating the reinforced electrically conductive gasket material on an enlarged scale.

Referring now to FIG. 1, electrically conductive gasket 10 includes upper and lower members 12 and 14 that are made of a gasket sealant material with highly conductive electrical matrix means 16. The electrical conductive matrix means 16 can be an inherent electrical conductive property of the gasket sealant material, such as strong electrolytes, or dispersed efficient electrical conductor materials such as gold, silver, copper, aluminum and etc. These materials are incorporated into conventional gasket sealant material as filings, slivers, sponges and etc. to form an electrically conductive network within the gasket sealant material. The particular sealant and electrical conductor material used will depend upon the required characteristics of the conductive gasket. Sandwiched between upper and lower members 12 and 14 is a reinforcing, efficient, electrical conducting member 18 that lends structural support to upper and lower members 12 and 14. Reinforcing member 18 can be made of efficient electrical conductor metal sheet, metal foil, metal screen, metal wires run parallel to upper and lower members 12 and 14 and etc. Reinforced electrically conductive gaskets of this type can be fabricated by molding the reinforcing member between upper and lower members or by bonding, with an electrically conductive adhesive 17, the upper and lower members to the reinforcing member so as in either case to form a seal with the gasket sealant and an effective electrical conductivity path between electrical conductive matrix means 16 and electrical conductor member 18.

Figure 2:
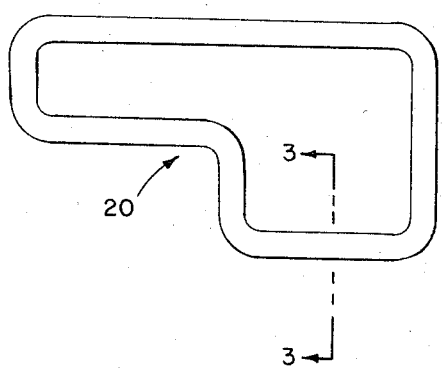
FIG. 2 is a top view of an electrically conductive gasket according to this invention.
Figure 3:
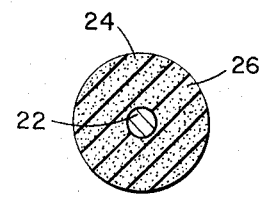
FIG. 3 is a sectional view taken along line 3—3 of FIG. 2.
Figure 4:
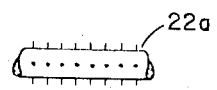
FIG. 4 is a view illustrating a modified reinforcing means.
Figure 5:
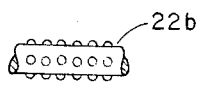
FIG. 5 is a view illustrating another modified reinforcing means.

FIGS. 2 and 3 illustrate another embodiment of the invention in which a reinforced electrically conductive elastomer seal 20 includes an inner reinforcing means 22 in a form such as a generally tubular member, about which sealant material 26 is formed. Reinforcing means 22 must be structurally strong and in most cases made of an efficient electrical conductive material. However, in some applications, it is not necessary that reinforcing means 22 be made from electrical conductive material. Also, in some applications it is desirable, in order to restrict plastic flow of the sealant material, to have barbs, perturbations, bumps, electrically conductive adhesive and etc. on the surface of the reinforcing means such as illustrated in FIGS. 4 and 5 as members 22a and 22b. Sealant material 26 has highly conductive matrix means 24 and matrix means 24 is made highly conductive in the same manner as disclosed for matrix means 16 of the disclosed species of FIG. 1.

The embodiments illustrated in FIGS. 2 and 5 can be fabricated by extruding the impregnated elastomer material around the reinforcing means or the elastomer material with the electrical matrix therein can be cast around the reinforcing means.

The inclusion of the high tensile strength material or reinforcing means —usually metal— must be accomplished in such a way that the elastic properties of the conductive elastomer are not materially degraded in the desired direction of gasket compression. The above described methods of incorporating the high strength reinforcing material accomplishes this end. Further, by employing a metallic tensile reinforcing member which is highly electrical conductive and chemically compatible with the conductive elastomer, the tensile reinforcing member aids in reducing the electrical resistance of the gasketed electrical joint.

The above disclosed reinforced highly conductive electrical gasket permits one to achieve the full and unique usefulness of a conductive elastomer, where such elastomer forms both the electrical and environmental seal by adding much needed tensile strength to the otherwise weak conductive elastomer. A second very practical advantage gained by this invention is that proper selection of the reinforcing material will yield an end product which will hold its shape to a much greater degree than present non-reinforced conductive elastomers.

The reinforced gaskets according to this invention are for inclusion in the mechanical interface between segments of an electromagnetic inclosure such as electronic equipment box, cabinet, or cell. The action of the gasket is to form a continuous, electrically conductive joint between the mating surfaces of the box, cabinet, or cell.

I claim:

1. An electrically conductive gasket for an electromagnetic enclosure; said gasket comprising an elastomeric material containing conductive particles and an electrically conducting reinforcement in the form of a single wire in communication with said conductive particles and located in the center of said elastomeric material, said reinforcement being interconnected forming a closed loop, said reinforcement having means thereon to restrict plastic flow of the elastomeric material and electrically interconnect said reinforcement and said conductive particles, and said elastomeric material having a generally circular outer surface and being mounted about said reinforcement with said reinforcement giving body support to the gasket.

2. An electrically conductive gasket as set forth in claim 1, wherein said means includes projections on said reinforcement in the form of bumps or barbs and said elastomeric material completely encloses said reinforcement.

* * * * *